United States Patent
Goodwin et al.

(10) Patent No.: US 12,367,023 B2
(45) Date of Patent: Jul. 22, 2025

(54) COMPILATION AND EXECUTION OF SOURCE CODE AS SERVICES

(71) Applicant: Microsoft Technology Licensing, LLC, Redmond, WA (US)

(72) Inventors: Robert Lovejoy Goodwin, Mercer Island, WA (US); Janaina Barreiro Gambaro Bueno, Redmond, WA (US); Sitaramaswamy V. Lanka, Mercer Island, WA (US); Dragos Barac, Sammamish, WA (US); Javier Garcia Flynn, Perth (AU); Pedram Faghihi Rezaei, Seattle, WA (US); Karthik Pattabiraman, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/206,725

(22) Filed: Jun. 7, 2023

(65) Prior Publication Data

US 2023/0315409 A1    Oct. 5, 2023

Related U.S. Application Data

(63) Continuation of application No. 16/457,323, filed on Jun. 28, 2019, now Pat. No. 11,714,616.

(51) Int. Cl.
*G06F 8/41* (2018.01)
(52) U.S. Cl.
CPC .................................. *G06F 8/434* (2013.01)
(58) Field of Classification Search
CPC ............. G06F 8/433; G06F 8/41; G06F 9/434
See application file for complete search history.

(56) References Cited

U.S. PATENT DOCUMENTS

| | | | |
|---|---|---|---|
| 6,732,090 B2 | 5/2004 | Shanahan et al. |
| 6,778,979 B2 | 8/2004 | Grefenstette et al. |
| 6,820,075 B2 | 11/2004 | Shanahan et al. |
| 6,928,425 B2 | 8/2005 | Grefenstette et al. |
| 7,117,432 B1 | 10/2006 | Shanahan |
| 7,284,191 B2 | 10/2007 | Grefenstette et al. |
| 7,647,349 B2 | 1/2010 | Hubert et al. |

(Continued)

FOREIGN PATENT DOCUMENTS

| | | |
|---|---|---|
| AU | 2004213986 A1 | 9/2004 |
| CN | 107851003 A | 3/2018 |

(Continued)

OTHER PUBLICATIONS

"Decision to Grant Issued in European Patent Application No. 20729904.1", Mailed Date: Jul. 20, 2023, 02 Pages.

(Continued)

*Primary Examiner* — S. Sough
*Assistant Examiner* — Cheneca Smith
(74) *Attorney, Agent, or Firm* — Rainier Patents, P.S.

(57) ABSTRACT

This document relates to compilation of source code into services. One example method involves receiving input source code, identifying data dependencies in the input source code, and identifying immutability points in the input source code based at least on the data dependencies. The example method also involves converting at least some of the input source code occurring after the immutability points to one or more service modules.

21 Claims, 15 Drawing Sheets

(56) References Cited

U.S. PATENT DOCUMENTS

| | | |
|---|---|---|
| 7,730,003 B2 | 6/2010 | Pinto |
| 7,983,971 B1 | 7/2011 | McLuckie |
| 8,099,758 B2 | 1/2012 | Schaefer et al. |
| 8,165,853 B2 | 4/2012 | Pinto et al. |
| 8,489,742 B2 | 7/2013 | Clubb et al. |
| 8,751,273 B2 | 6/2014 | Pinto |
| 8,924,269 B1 | 12/2014 | Parvatikar et al. |
| 9,323,517 B2 | 4/2016 | West |
| 9,357,034 B2 | 5/2016 | Kumar |
| 9,424,024 B2 | 8/2016 | Kannan |
| 9,734,221 B2 | 8/2017 | Sarferaz |
| 9,934,295 B2 | 4/2018 | Sarferaz |
| 10,191,802 B2 | 1/2019 | Nautiyal |
| 10,235,439 B2 | 3/2019 | Sullivan |
| 10,360,231 B2 | 7/2019 | Hyde |
| 10,360,563 B1 | 7/2019 | Clubb |
| 10,678,601 B2 | 6/2020 | Wong |
| 2005/0022114 A1 | 1/2005 | Shanahan et al. |
| 2005/0234688 A1 | 10/2005 | Pinto et al. |
| 2005/0234697 A1 | 10/2005 | Pinto |
| 2005/0234698 A1 | 10/2005 | Pinto et al. |
| 2005/0234760 A1 | 10/2005 | Pinto |
| 2009/0031292 A1* | 1/2009 | Fulton ............... G06F 9/4493 717/151 |
| 2012/0197608 A1 | 8/2012 | Pinto et al. |
| 2012/0215560 A1 | 8/2012 | Ofek |
| 2013/0125097 A1 | 5/2013 | Ebcioglu et al. |
| 2013/0346376 A1* | 12/2013 | Dmitriev ............... G06F 16/174 707/E17.005 |
| 2013/0346988 A1* | 12/2013 | Bruno ................ G06F 9/5066 718/102 |
| 2014/0075019 A1 | 3/2014 | Mordani |
| 2014/0075431 A1 | 3/2014 | Kumar |
| 2014/0115560 A1 | 4/2014 | Hutchison |
| 2014/0123118 A1* | 5/2014 | Goetz ..................... G06F 8/30 717/140 |
| 2014/0211665 A1 | 7/2014 | Voccio |
| 2014/0337461 A1 | 11/2014 | Lipstone |
| 2014/0344391 A1 | 11/2014 | Varney et al. |
| 2014/0344399 A1 | 11/2014 | Lipstone et al. |
| 2014/0344400 A1 | 11/2014 | Varney et al. |
| 2014/0344401 A1 | 11/2014 | Varney |
| 2014/0344425 A1 | 11/2014 | Varney |
| 2014/0344452 A1 | 11/2014 | Lipstone |
| 2014/0344453 A1 | 11/2014 | Varney et al. |
| 2014/0372533 A1 | 12/2014 | Fu et al. |
| 2016/0291942 A1* | 10/2016 | Hutchison ............... G06F 8/311 |
| 2017/0201569 A1 | 7/2017 | Fu et al. |
| 2017/0206256 A1 | 7/2017 | Tsirogiannis et al. |
| 2017/0257432 A1 | 9/2017 | Fu et al. |
| 2018/0203794 A1 | 7/2018 | Voccio |
| 2018/0329958 A1* | 11/2018 | Choudhury ......... G06F 16/2456 |
| 2018/0357292 A1 | 12/2018 | Rai |
| 2018/0357556 A1 | 12/2018 | Rai et al. |
| 2018/0357595 A1 | 12/2018 | Rai |
| 2019/0007521 A1 | 1/2019 | Lipstone |
| 2019/0138532 A1 | 5/2019 | Seng et al. |
| 2019/0166173 A1 | 5/2019 | Zhou |
| 2019/0179564 A1 | 6/2019 | Bernat |
| 2019/0260796 A1 | 8/2019 | Amine |
| 2019/0394224 A1 | 12/2019 | Hamdi |
| 2020/0110676 A1* | 4/2020 | Volos .................... G06F 11/203 |
| 2020/0252415 A1 | 8/2020 | Hamdi |

FOREIGN PATENT DOCUMENTS

| | | |
|---|---|---|
| CN | 109074265 A | 12/2018 |
| CN | 109891415 A | 6/2019 |
| CN | 110392876 A | 10/2019 |
| WO | 03001413 A1 | 1/2003 |
| WO | 2005106656 A2 | 11/2005 |
| WO | 2019021048 A1 | 1/2019 |
| WO | 2019099111 A1 | 5/2019 |

OTHER PUBLICATIONS

Communication pursuant to Article 94(3) EPC Received for European Application No. 20751389.6, mailed on Jun. 25, 2024, 07 pages.

First Examination report received for Indian Application No. 202147051365, mailed on Mar. 6, 2024, 07 pages.

Office Action Received for Chinese Application No. 202080047341.8, mailed on Oct. 31, 2024, 7 pages. (English translation Provided).

Intimation of Grant received for Indian Application No. 202147051365, mailed on Mar. 13, 2025, 1 page.

Notice of Allowance Received for Chinese Application No. 202080047341.8, mailed on Mar. 14, 2025, 2 pages.

* cited by examiner

FIG. 2

```
ParallelLoop.cs ⊣⊐ ✕
C# Parallel Loop Application
    using System;
    using System.Threading.Tasks;

//*************************************PARALLEL
    LOOP*****************************************   — 202
    public class ParallelLoop
    {
        string Execute(string[] inputs)
        {
            string responses = new string[3];
            for (int i = 0; i < 3; i++)
            {
                responses[i] = TimeConsumingCalculation(inputs[i]);
            }
            return await responses[0] + await responses[1].Result + await
    responses[2].Result;
        }
    }
```

```
public class ConvertedParallelLoop
{
    public async Task<string> Plugin_0(Task<string> input)
    {
        return TimeConsumingCalculation(await input);
    } public async Task<string> Plugin_1(Task<string> in1, Task<string> in2, Task<string> i3)
    {
        return await in1 + await in2 + await in3;
    } public async Task<string> Workflow(Task<string>[] inputs)
    {
        Task<string> response0 = Plugin_0(await inputs[0]);
        Task<string> response1 = Plugin_0(await inputs[1]);
        Task<string> response2 = Plugin_0(await inputs[2]);
        return Plugin_1(await response0, await response1, await response2);
    }
}
```

```
public class ConvertedSerialLoop
{
    public async Task<string> Plugin_0(string input)
    {
        return TimeConsumingCalculation(input);
    } public async Task<string> Workflow(Task<string> input)
    {
        Task<string> response0 = Plugin_0(await input);
        Task<string> response1 = Plugin_0(await response0);
        Task<string> response2 = Plugin_0(await response1);
        return response2;
    }
}
```

```
ParallelLoop.cs
C# Parallel Loop Application using System;
    using System.Threading.Tasks;      202 public class MixedParallelSerialLoop
    {
        string Execute(string[] inputs)
        {
            string responses = new string[3];
            string combine = "";
            for (int i = 0; i < 3; i++)
            {
                responses[i] = TimeConsumingCalculation(inputs[i]);
                combine += await responses[i];
            }
            return combine;                      602
        }
    }
```

```
public class ConvertedMixedParallelSerialLoop                    700
{
    public async Task<string> Plugin_0(string input)
    {
        return TimeConsumingCalculation(input);
    } public async Task<string> Plugin_1(Task<string> in1, Task<string> in2, Task<string> i3)
    {
        return await in1 + await in2 + await in3;
    } public async Task<string> Workflow(Task<string>[] inputs)
    {
        Task<string> response0 = await Plugin_0(await inputs[0]);
        Task<string> response1 = await Plugin_0(await inputs[1]);
        Task<string> response2 = await Plugin_0(await inputs[2]);
        return Plugin_1(await response0, await response1, await response2);
    }
}
```

FIG. 7

```
public class ConvertedEmbeddedFunctions
{
    public async Task<string> Plugin_0(Task<string> input)
    {
        return TimeConsumingCalculation((await input).ToLower()).ToUpper();
    } public async Task<string> Plugin_1(string input)
    {
        return input.ToLower();
    } public async Task<string> Workflow(Task<string>[] inputs)
    {
        Task<string> response0 = await Plugin_0(await input);
        return await Plugin_1(await response0);
    }
}
```

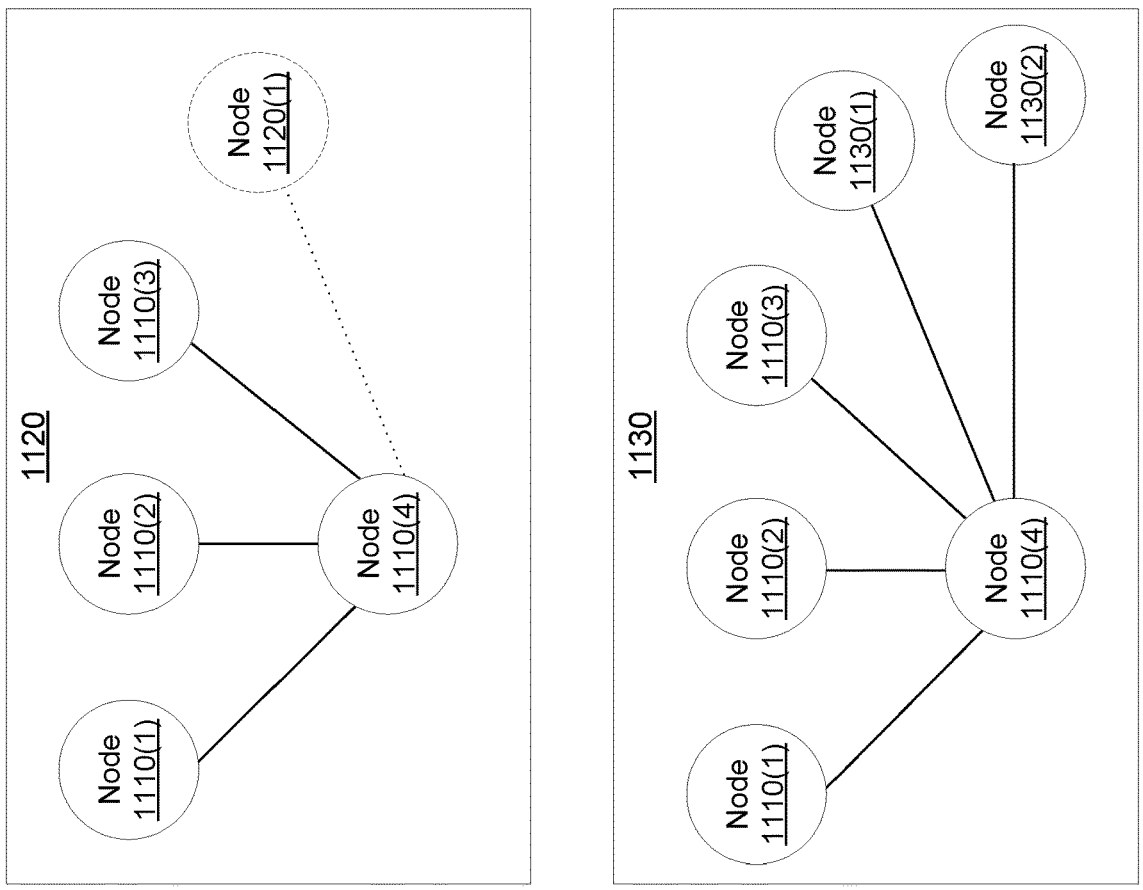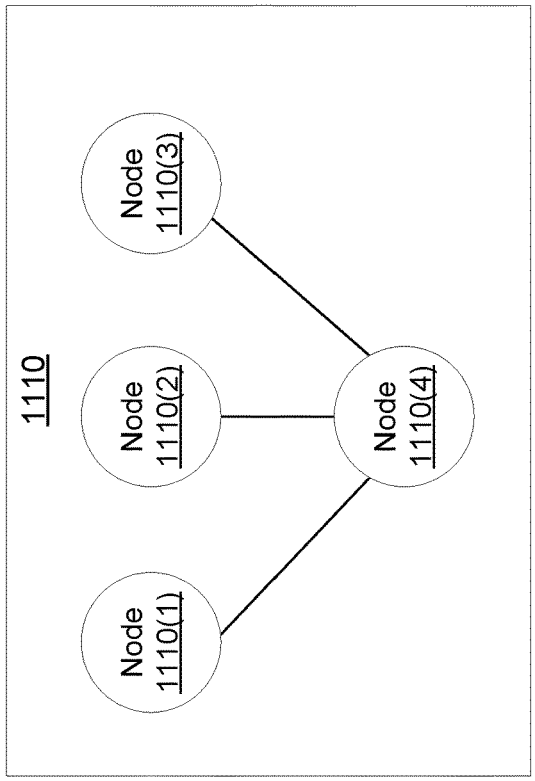
FIG. 11

1200

```
ParallelLoop pl = new ParallelLoop();

string Main1()
{
   string[] in1 = new string[] { "a", "b", "c" };
   return pl.Execute(in1);
} string Main2()
{
   string[] in2 = new string[] { "a", "b", "c" };
   string x= pl.Execute(in2);
   in2[0] = "x";
   in2[1] = "y";
   in2[2] = "z";
   return x + "0";
}
```

FIG. 12

COMPILATION AND EXECUTION OF SOURCE CODE AS SERVICES

BACKGROUND

Ideally, software development results in software with certain characteristics, such as performance, scalability, and agility. Performance can generally be defined in terms of metrics such as latency and resource utilization. Scalability relates to the ability to perform more work by adding new resources, ideally without expensive operations such as rebooting machines or rewriting the underlying code. Agility relates to how easy or difficult it is for developers to develop code rapidly, e.g., by adding new functionality to existing code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for compilation of imperative source code into services, and for runtime processing of the services. One example includes a method or technique that can be performed on a computing device. The method or technique can include receiving input source code, identifying data dependencies in the input source code, and identifying immutability points in the input source code based at least on the data dependencies. The method or technique can also include converting at least some of the input source code occurring after the immutability points to one or more service modules.

Another example includes a system having a hardware processing unit and a storage resource storing computer-readable instructions. When executed by the hardware processing unit, the computer-readable instructions can cause the hardware processing unit to receive input source code for an application, identify data dependencies in the input source code, and identify immutability points in the input source code based at least on the data dependencies. The computer-readable instructions can cause the hardware processing unit to convert at least some of the input source code occurring after the immutability points to one or more service modules and schedule service tasks that execute the service modules at runtime consistently with the data dependencies.

Another example includes a method or technique that can be performed on a computing device. The method or technique can include obtaining one or more service modules and a partial dependency graph of service tasks for executing the one or more service modules. The method or technique can also include executing the service tasks in an application process and detecting a particular runtime value that is output by a particular service task. The method or technique can also include inserting one or more additional service tasks into the partial dependency graph based at least on the particular runtime value, to obtain a completed dependency graph. The method or technique can also include executing the one or more additional service tasks in the application process based at least on the completed dependency graph.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2, 4, 6, and 8 illustrate examples of input source code in a development environment interface, consistent with some implementations of the present concepts.

FIGS. 3, 5, 7, and 9 illustrate examples of converted source code, consistent with some implementations of the present concepts.

FIG. 11 illustrates several dependency graphs, consistent with some implementations of the present concepts.

FIG. 12 illustrates an additional source code example, consistent with some implementations of the present concepts.

DETAILED DESCRIPTION

Overview

Figure 1:
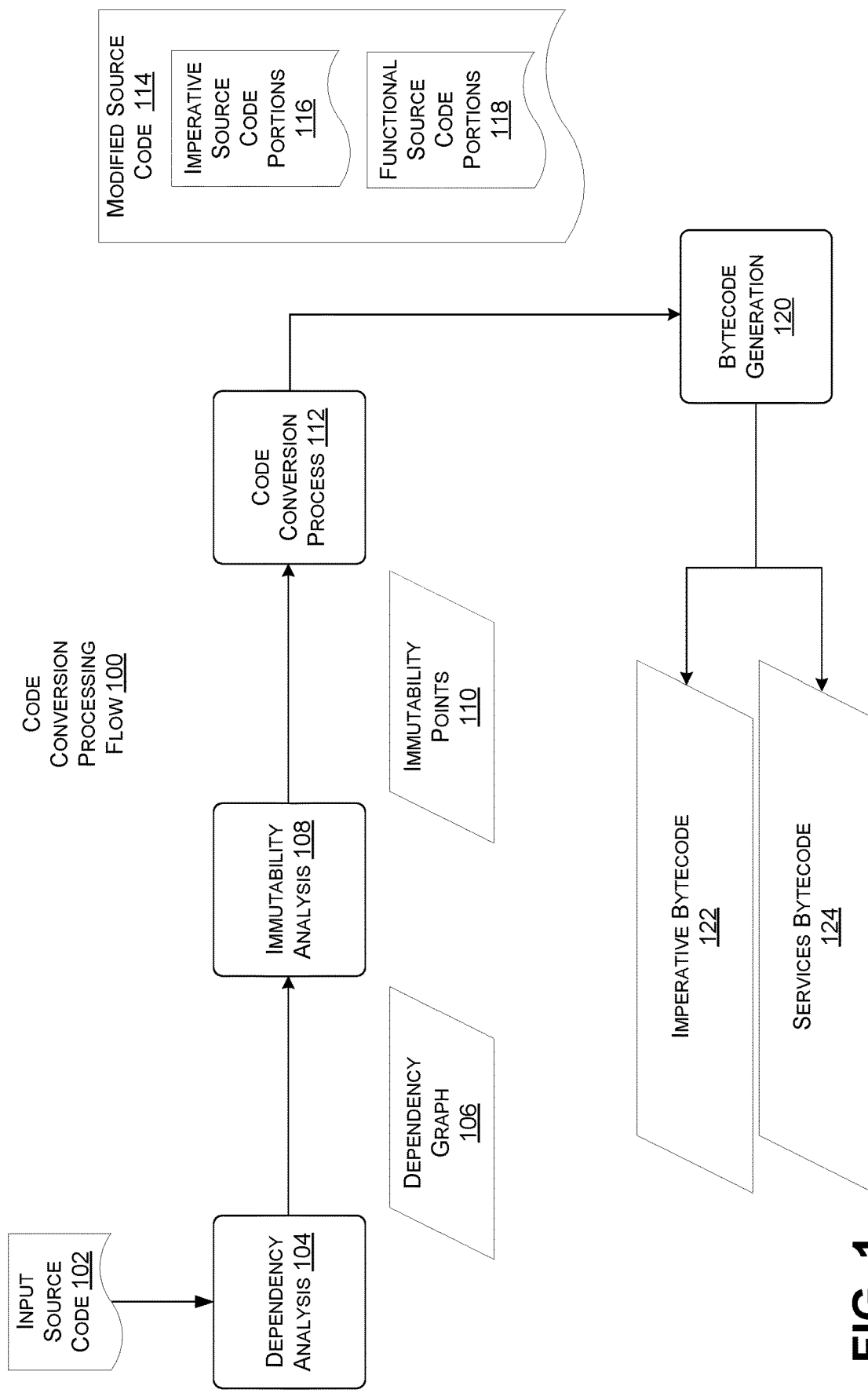
FIG. 1 illustrates an example processing flow for converting input source code, consistent with some implementations of the present concepts.

As noted, software development aims to produce software that exhibits good performance, scalability, and agility. Traditionally, however, software developers have had to choose from programming approaches that tended to favor some of these characteristics at the expense of others. For example, one approach to writing cloud software is to write a "monolith"—a single, large piece of code that runs an entire cloud service within a single process. Cloud monoliths tend to have high performance and can easily be scaled to increased loads by simply adding new processes that run copies of the cloud monolith code. However, monolithic code tends to lack agility—it is difficult for developers to make changes to a cloud monolith without causing unexpected side effects or errors that tend to slow the development process.

Another approach to developing software is the library model, where developers write individual code modules or "libraries" that can be linked to other modules at compile time (static libraries) or at runtime (dynamic libraries). This approach tends to result in executables that provide good performance and agility but can be difficult to scale when changes are made to individual libraries because of dependencies between the libraries. Another alternative is to deploy code modules as independent services that execute in separate processes. By writing services that lack dependencies on one another, this can be scalable and agile approach but can exhibit poor performance as a result of excessive network usage and data serialization between the processes.

Moreover, programmers today tend to be familiar with imperative programming styles. In imperative programming, developers manipulate program state (i.e., data) with operations on data, often using procedural programming languages such as C or FORTRAN or object-oriented programming languages such as Java, C++, and C #. However, imperative programming often results in code modules that have side effects on external data, or that execute differently depending on external program state. As a consequence of these data dependencies, it can be difficult to parallelize imperative code or execute portions of imperative code in a different order than originally specified by the developer.

One approach that can help mitigate some of the issues mentioned above involves functional programming. In functional programming, developers write code that avoids mutable data. As a consequence, functional code tends to lack data dependencies between individual code modules, and thus functional code modules can be more readily parallelized or executed independently, e.g., by running functional modules optimistically. However, writing functional code requires developers to either write in functional programming languages such as LISP that tend to be unfamiliar to the developers, or to force themselves to use unfamiliar functional programming techniques with languages originally designed for imperative or object-oriented programming.

The disclosed implementations generally aim to provide some of the benefits of functional programming without requiring developers to write functional code. At a high level, the disclosed implementations can transform input source code written an imperative style into functional code. The functional code can implement the functionality of the input source code in one or more service modules. As discussed more below, converting the input source code into service modules can enable the service modules to be executed independently at runtime. This can provide performance improvements via optimistic execution, prioritization, parallelization, and reduced data serialization, as discussed more below.

The disclosed implementations also offer scalability, because service modules can be deployed according to demand, e.g., by running additional copies of heavily-used services and fewer copies of less-frequently used services. Furthermore, the disclosed implementations offer agility, as the service modules can be updated by hot-swapping new code without needing to take an entire application down to recompile and reboot, as would typically be the case with a library-style approach.

Example Source Conversion Processing Flow

FIG. 1 illustrates an example code conversion processing flow 100, consistent with the disclosed implementations. The code conversion processing flow 100 performs various operations on input source code 102, which can include part or all of an application, as discussed more below. For instance, the input source code can be an object-oriented program written in a language such as Java, C++, or C #, with various defined object types and corresponding member functions and variables. In other cases, the input source code can be in a procedural language such as C or FORTRAN. In either case, there may be many different complex dependencies between individual data items in the input source code.

Conventionally, the developer is responsible for specifying the order of operations in the input source code to achieve a correct programming result, and the input source code is compiled into binary code or bytecode that executes the operations in the order specified by the programmer. In some implementations, code conversion processing flow 100 converts the input source code into functional, service-based code that can be executed in a different order than that specified by the input source code 102. As discussed more below, one way to describe functional code is code that can be represented as a directed acyclical graph with immutable outputs.

Code conversion processing flow 100 begins by performing a dependency analysis 104 on the input source code 102. The dependency analysis constructs a dependency graph 106, which represents dependencies between individual data items in the input source code. For instance, if one variable is modified in the input source code based on the value of another variable, the dependency graph will identify this dependency between the two variables. Depending on the complexity of the application, the dependency graph can be relatively simple or very complex. Example dependency graphs are discussed more below with respect to FIG. 11.

Code conversion processing flow 100 continues with immutability analysis 108. The immutability analysis identifies, where possible, lines in the input source code where individual data items become "immutable." In other words, the immutability analysis identifies points in the input source code where certain data items cease to be modified. In some cases, a given data item does not become immutable at any point, e.g., the data item is susceptible to being changed at any time. In other cases, data items can be immutable throughout the source code, e.g., a given data item can be assigned an initial value and never subsequently modified. In still further cases, some data items may be modified by one or more operations in the code and then subsequently become immutable once a certain point in processing is reached. For those data items that do become immutable at some point, the immutability analysis identifies immutability points 110, which represent the respective points at which those data items become immutable. Example immutability analysis is discussed more below with respect to FIG. 12.

Once the immutability analysis 108 completes, the immutability points 110 are input to a code conversion process 112. The code conversion process outputs modified source code 114, which can include imperative source code portions 116 and functional source code portions 118. The imperative source code portions generally include portions of the input source code that occur prior to an identified immutability point for a given data item. In some cases, the imperative source code can also be modified by the code conversion process. Even if modified, however, operations on mutable data items in the imperative source code are performed in the order specified in the input source code 102 to ensure correctness.

The functional source code portions generally include code that executes after the immutability point for a given data item. As discussed more below, the functional source code portions can include service modules that perform operations originally specified imperatively in the input source code, and that may lack data dependencies on other service modules. As a consequence, the service modules do not necessarily need to perform operations in the same order specified by the input source code 102, as discussed more below.

The modified source code 114 can be input to a bytecode generation process 120. The bytecode generation process can convert the imperative source code portions 116 to imperative bytecode 122 and can convert the functional source code portions 118 to services bytecode 124. As discussed more below, the services bytecode can perform similar or equivalent functionality to the input source code from which it was derived, while executing as one or more service tasks that allow for parallelization, run-in-anticipation, prioritization, and/or reduced data serialization, as discussed more below.

For the purposes of this document, the term "imperative source code" means source code, typically written by a developer, that manipulates program state via operations defined in the source code. Imperative source code often has complex data dependencies between individual code modules. The term "functional source code" means imperative source code that has been manipulated by a code conversion process to mitigate at least some of the data dependencies in the imperative source code. In the examples discussed herein, functional source code is generated by converting certain operations defined in imperative source code into service modules. The term "imperative bytecode" means bytecode derived by compiling imperative source code. The term "services bytecode" means bytecode derived by compiling functional source code that includes service modules and corresponding service tasks that can be scheduled and orchestrated at runtime, as discussed further below.

First Source Code Example

FIG. 2 illustrates a development environment interface 200 with a code editor 202 that can be used to enter input source code 204 for subsequent processing by code conversion processing flow 100. Note that the following examples use C #for source code examples, but the techniques described herein are readily extensible to other programming languages. In the example shown in FIG. 2, the input source code includes a class ParallelLoop with a member function called Execute( ) that receives an input parameter, an array of strings called inputs. The Execute function processes each element of the input string using a function called TimeConsumingCalculation( ) that outputs a return string, which is placed into a local string array called responses. The TimeConsumingCalculation( ) function is called in a for loop three times, and the return value populates a corresponding entry in responses. When the Execute( ) function completes, a concatenation operation is performed on each entry in responses, and the result of the concatenation operation is returned to the caller of the Execute( ) function.

Conventionally, input source code 204 would be compiled directly into bytecode that executes the operations of the Execute( ) function in sequential order, including each iteration of the for loop. Thus, each iteration of the for loop would need to complete execution before the next iteration of the for loop would begin. Thus, assuming the TimeConsumingCalculation( ) function takes 0.5 seconds each time it is called, the Execute( ) function takes a minimum of 1.5 seconds. In addition, conventionally, the Execute( ) function would not run until being explicitly called by some other module defined in the source code.

In general, input source code 204 may be part of a larger application that creates one or more instances of the ParallelLoop class. Each of those instances of the ParallelLoop class may pass different input strings to the Execute( ) function. The immutability analysis 108 may detect whether those input strings are mutable, e.g., whether they can be changed after the call to the Execute( ) function. For those calls to the Execute( ) function with mutable inputs, the code conversion can compile the input source code into corresponding imperative bytecode 122. However, for those calls to the Execute( ) function with inputs that are immutable, e.g., are not modified in the input source code after the call to the Execute( ) function, those instances of the ParallelLoop class can be converted into functional source code portions 118 and corresponding services bytecode 124 as follows.

FIG. 3 illustrates an example output of the development environment as converted source code 300, which is one example of functional source code. In this example, the input source code 204 has been converted into a class called ConvertedParallelLoop. The functionality of the Execute( ) function has been broken down into several functional modules, Plugin_0, Plugin_1, and Workflow. Generally, Plugin_0 is a service module that performs the TimeConsumingCalculation( ) function, Plugin_1 is a service module that aggregates the intermediate results of TimeConsumingCalculation( ) into a final return value, and the WorkFlow module coordinates processing performed by Plugin_0 and Plugin_1.

Comparing input source code 204 to converted source code 300, note the following. First, the input source code sets forth a specific order in which operations are performed on multiple data items, such as inputs and the individual elements of the responses array. Conventionally, the input source code would compile to bytecode that implements these operations in the order defined in the source code.

On the other hand, the converted source code 300 implements the functionality of input source code 204 using multiple service modules, such as Plugin_0 and Plugin_1. The Workflow module designates multiple service tasks that can be used at runtime to execute one or more instances of each service module. Here, the Workflow module has created three service tasks that can execute different instances of the Plugin_0 service module. Each service module is defined in a manner similar to a microservice, where the respective service modules are independently deployable and lack data dependencies between one another. However, as discussed more below, the service modules can be executed using multiple tasks that run in a single application process and communicate via shared memory, thus avoiding serialization and network overhead typically associated with microservice architectures that run services in separate processes and perform inter-service communication over a network.

Referring back to FIG. 2, note that each iteration of the for loop populates a different iteration-specific entry in the responses string that is returned when the Execute( ) function completes. As a consequence, the final value of the local responses variable does not depend on the order in which the loop iterations are performed. The code conversion process 112 can detect that each entry in the responses string is only updated in one iteration of the loop. Each iteration is determined to have no dependency on any other iteration. Also, the immutability analysis has determined that that each input to the iteration is immutable as of the beginning of the iteration. As a consequence, the functionality of the loop iterations can be converted to parallel tasks. Thus, the Workflow service module created by the code conversion process uses asynchronous service tasks to execute three instances of Plugin_0.

Generally, asynchronous tasks can run any time and in any order. Thus, each service task can be run in the absence of an explicit call from another code module. Rather, each service task can be run whenever the input data for that service task is available, thus providing opportunities to run the service task in anticipation. In the example Workflow module shown in FIG. 3, the await keyword is used to ensure that a given service task waits for data used as input to that task. Assuming that all three elements of inputs are available together at runtime, the Workflow module effectively configures these tasks so that they can be parallelized at runtime.

For the purposes of this document, the term "application process" refers to application code, memory allocated to execute the application code, and state associated with the application process. An application process can have one or more threads, each of which can share the same memory allocated to the process. For instance, in some cases, an application process can be allocated a designated virtual memory space by an operating system or hypervisor, and each thread in the application process can share that virtual memory space. The term "thread" refers to a sequence of instructions that can be scheduled independently at runtime.

The term "task" refers to a data object that represents work that has been or will be performed by an application program. At runtime, different tasks can be assigned to different threads. When two or more tasks are concurrently executing in different threads, the tasks can be considered to run in parallel. In some cases, different threads can run on different processors, and in other cases, a single processor can execute multiple threads concurrently. The term "service task" refers to a task that executes a service module.

Second Source Code Example

Figure 4:
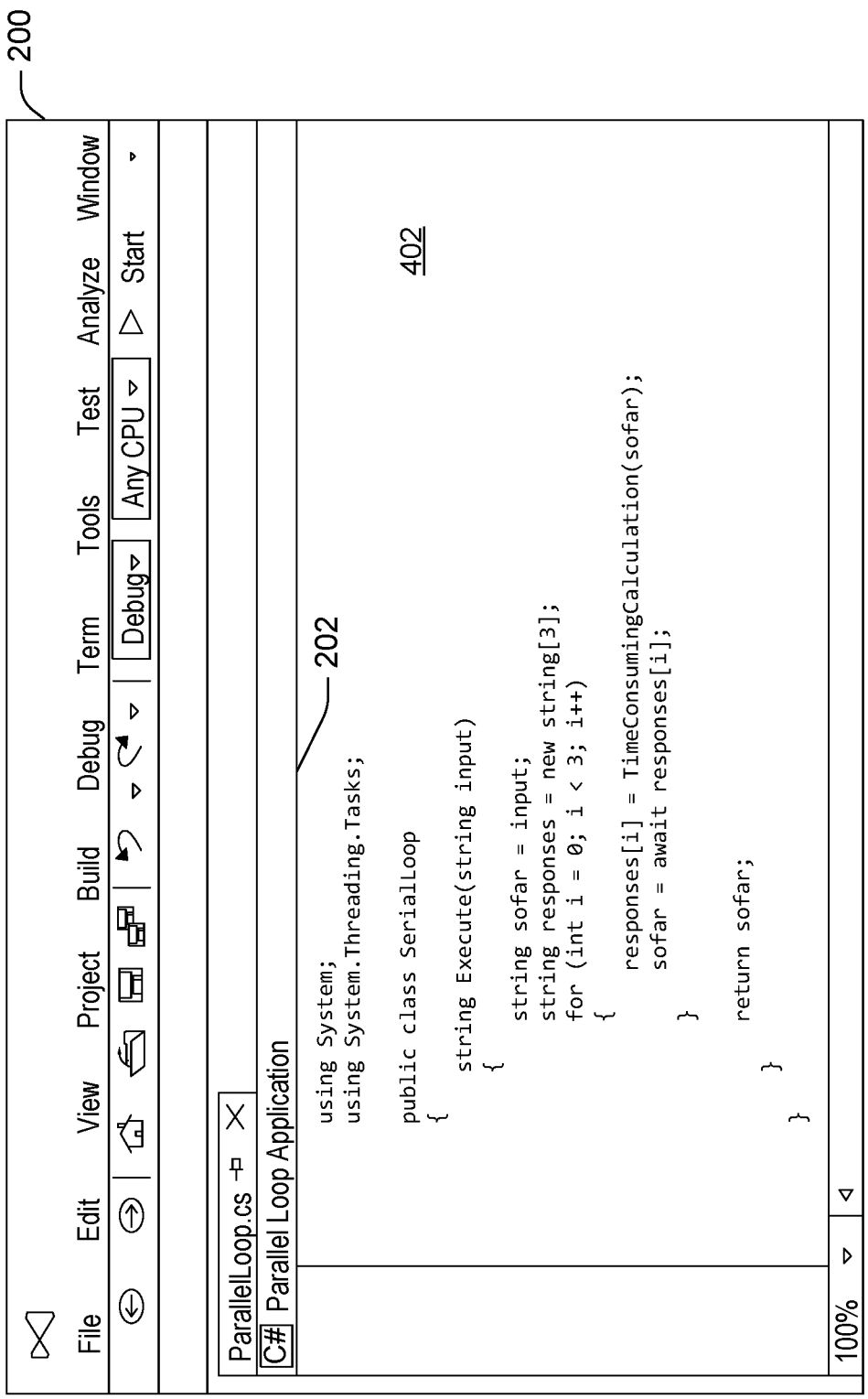

FIG. 4 illustrates another source code example. Here, the code editor 202 of development environment interface 200 includes input source code 402. In this case, the input source code includes a class SerialLoop with a member function called Execute( ) that receives a string called input as an input parameter and returns a local variable called sofar as an output parameter. In addition, another local variable responses is an array of three strings that is updated in each loop iteration with the output of the TimeConsumingCalculation( ) function on the variable sofar. Since sofar is updated within the loop itself and used in subsequent loop iterations as an input to the TimeConsumingCalculation( ) each loop iteration has a data dependency on the previous iteration.

As with the previous example, input source code 402 would conventionally be compiled directly into bytecode that executes the operations of the Execute( ) function in the order defined in the input source code, and that waits for the Execute( ) function to be called elsewhere in the code. However, as with the previous example, the application may include instances of the SerialLoop class that receive immutable data as an input to the Execute( ) function. Any calls to the Execute( ) function of the SerialLoop class in the input source code that occur after the immutability point for the input parameter can be converted as shown below. In particular, the development environment can convert the input source code 402 into a discrete set of service modules, as discussed more below.

FIG. 5 illustrates an example output of the development environment as converted source code 500, which is another example of functional source code. In this example, the input source code 402 has been converted into a class called ConvertedSerialLoop with two modules, Plugin_0 and Workflow. The Workflow module creates three service tasks that each run Plugin_0 at runtime. While asynchronous tasks can generally run independently, in this case, the code conversion process 112 has recognized the data dependency across multiple loop iterations. The first service task defined in the Workflow module runs Plugin_0 and awaits input data and can run as soon as the input data is available. However, the second two service tasks depend on response variables response0 and response1, which are not available until after they are output by the first service task running Plugin_0. As a consequence, the data dependencies in the original SerialLoop class are accommodated and the converted source code can still function correctly because the service tasks will run in series rather than in parallel.

As discussed more below, while this example may not provide an opportunity for parallelism, there are nevertheless opportunities at runtime run the service tasks in advance and/or prioritize the service tasks executing the service modules. Thus, converted source code 500 can still enable some performance enhancements that may not be available with input source code 402, which would conventionally wait until an explicit call to the Execute( ) function occurs before performing the aforementioned operations.

Third Source Code Example

FIG. 6 illustrates another source code example. Here, the code editor 202 of development environment interface 200 includes input source code 602. The input source code includes a class MixedParallelSerialLoop with a member function called Execute( ) that receives a string array called inputs as an input parameter and returns a local variable called combine as an output parameter. In this example, the call to TimeConsumingCalculation( ) takes a different element of inputs as a parameter in each iteration of the loop. Thus, the output populated into the responses string array is independent across loop iterations. In other words, the responses string array will look the same regardless of whether the loop iterations are performed sequentially.

However, the local string variable combine is updated with a "+=" string concatenation operation. Unlike a mathematical addition operation, string concatenations are not commutative. Said differently, string1+string2+string3 does not necessarily equal string1+string 3+string 2. Thus, the "+=" operation performed on the combine variable imposes a data dependency across loop iterations. As with the previous example, input source code 602 would conventionally be compiled directly into bytecode that executes the operations as defined in the input source code. Thus, for example, TimeConsumingCalculation( ) would be called first and followed by the concatenation operation in each iteration of the loop.

In some cases, the application may include instances of the MixedParallelSerialLoop class that receive immutable data as input parameters to the Execute( ) function. Any calls to the Execute( ) method of the MixedParallelSerialLoop class in the input source code that occur after the immutability point for the data used as the input to Execute( ) can be converted into service modules. In particular, the development environment can compile the source code into a discrete set of service modules, as discussed more below.

FIG. 7 illustrates an example output of the development environment as converted source code 700. In this example, the converted source code includes a class called ConvertedMixedParallelSerialLoop, which includes a Plugin_0 service module, a Plugin_1 service module, and a Workflow module. The Plugin_0 service module performs the TimeConsumingCalculation( ) function on elements of the input string, and thus the Workflow module can use asynchronous service tasks to execute Plugin_0 once inputs is populated at runtime. However, the call to Plugin_1 in the Workflow module awaits the results of all of the instances of Plugin_0—in other words, each response variable response0, response1, and response2 is populated by a different task executing Plugin_0 before Plugin_1 is invoked.

By converting the input source code 602 to converted source code 700 as discussed above, the three iterations of TimeConsumingCalculation( ) in the input source code can be partially parallelized, prioritized, and run in anticipation at runtime rather than following the order of operations defined in the input source code. The loop dependency in the concatenation operation can be handled by the await statements in the Workflow module that wait for the local variables to be populated before running Plugin_1.

Thus, FIGS. 6 and 7 collectively illustrate an example where some parts of a loop can be parallelized as service modules that execute as a set of asynchronous tasks, and other parts of the loop can be implemented by awaiting results of these service tasks. As a consequence, some parallelization benefit is achieved while still executing logically-correct code that does not violate the data dependencies in the input source code 602.

Note that FIGS. 6 and 7 illustrate a particular subtlety in the code conversion process 112. In input source code 602, the TimeConsumingCalculation( ) call and the +=operation occur in the same loop. The code conversion process can move the +=operation to run later, e.g., as late as possible without altering the behavior of the application program. This is illustrated in converted source code 700 by Plugin _1, which runs after three calls to TimeConsumingCalculation( ) in Plugin_0. This allows for parallelization of the calls to TimeConsumingCalculation( ).

Fourth Source Code Example

Figure 8:
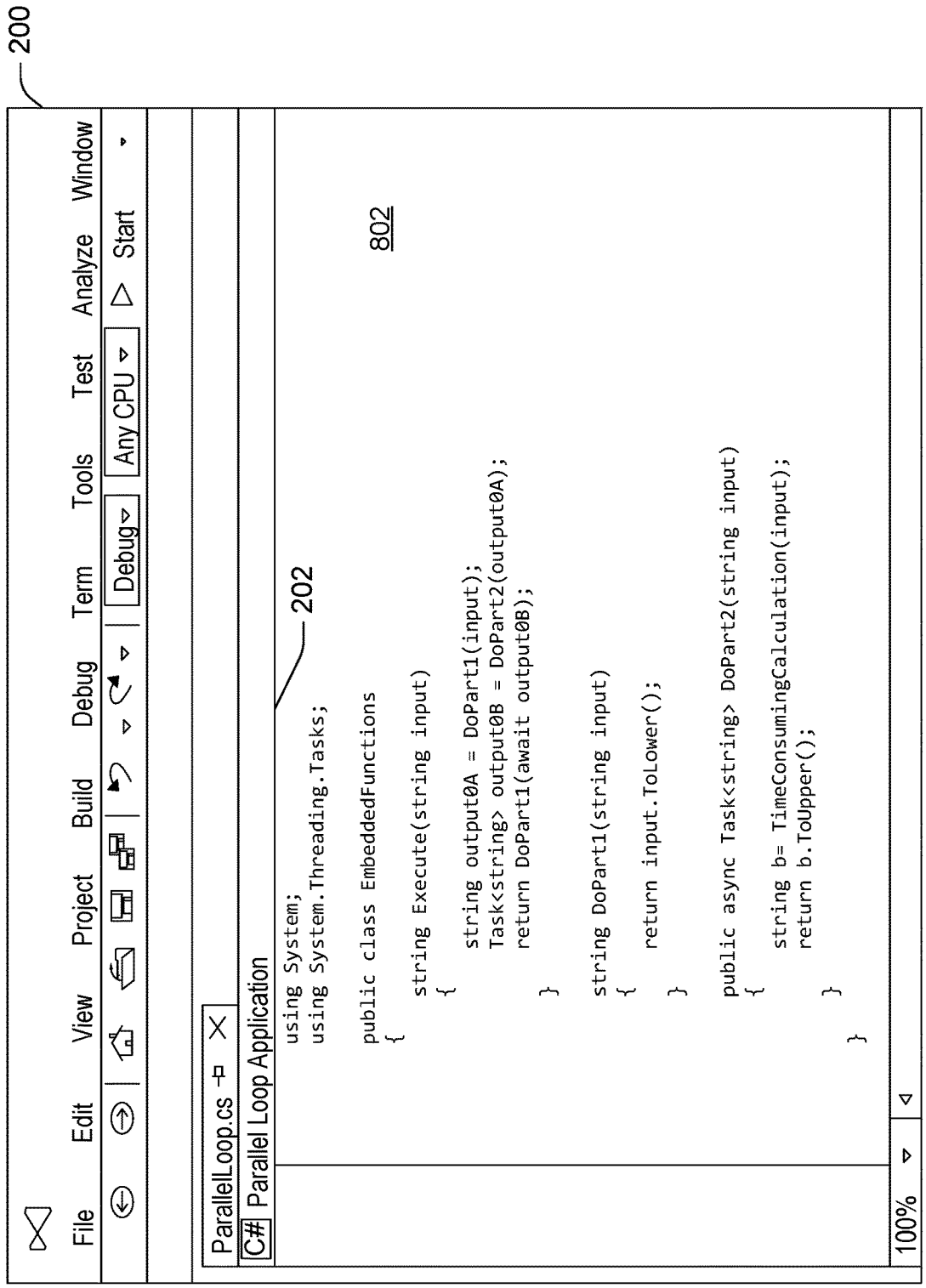

FIG. 8 illustrates another source code example. Here, the code editor 202 of development environment interface 200 includes input source code 802. In this case, the input source code includes a class called EmbeddedFunctions, with member functions Execute( ) DoPart1( ), and DoPart2( ). DoPart1( ) executes a C #function called ToLower( ) that converts a string to lowercase. DoPart2( ) executes the TimeConsumingCalculation( ) function and also a C #function called ToUpper( ) that converts a string to uppercase. The Execute( ) function calls DoPart1 on a string input parameter called input, passes the result to DoPart2 via a local variable called output0A, and passes the result of DoPart2 to DoPart1 via another local variable called output0B.

As with the previous examples, this source code example would conventionally be compiled directly into bytecode. The operations would be performed in the order specified by the source code, and would not execute until invoked by another module in the application. However, as with the previous examples, the application may include some instances of the EmbeddedFunctions class that receive immutable data as an input to the Execute( ) function. Any calls to the Execute( ) function of the EmbeddedFunctions class in the original source code that occur after the immutability point for the input parameter can be converted as shown below. In particular, the development environment can convert the input source code 802 into a discrete set of functional service modules, as discussed more below.

FIG. 9 illustrates an example output of the development environment as converted source code 900. In this example, the converted source code includes another class called ConvertedEmbeddedFunctions. The ConvertedEmbeddedFunctions class includes two service modules, Plugin_0 and Plugin_1, and a Workflow module. Plugin_0 converts an input string to lowercase, performs TimeConsumingCalculation( ) on the result, and then converts the result to uppercase. This effectively performs the same operations as the first two lines of code in the Execute function of input source code 802. Plugin_1 does a lowercase conversion of a string that is input to this service module. The Workflow module first creates a service task that runs Plugin_0 and stores the return value in a local response0 variable, then awaits response0 to be populated by the service task running Plugin_0 before passing it to Plugin_1.

Note that this particular example does not exhibit parallel instances of plugins. Nevertheless, as discussed more below, performance benefits can be obtained by optimistic execution, prioritization, scheduling, and/or orchestration.

Example Runtime Processing Flow

Figure 10:
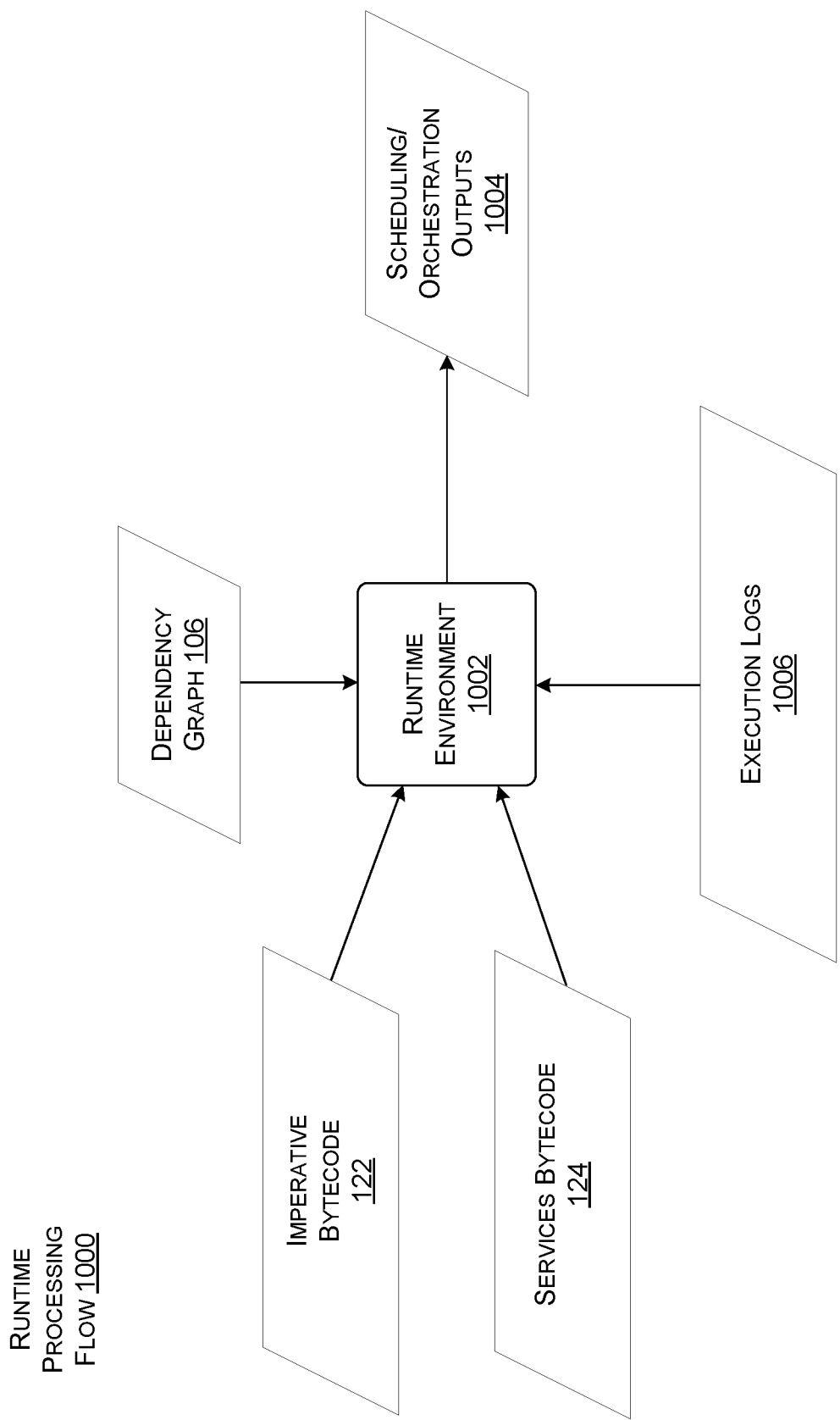
FIG. 10 illustrates an example runtime processing flow, consistent with some implementations of the present concepts.

FIG. 10 illustrates an example runtime processing flow 1000, consistent with the disclosed implementations. The runtime processing flow involves inputting various items into a runtime environment 1002 to obtain scheduling and/or orchestration outputs 1004. As discussed more below, scheduling outputs can determine when to run a given service task, and orchestration outputs can determine where to run a given service task, e.g., in a specific process or on a specific physical machine.

The inputs to the runtime environment 1002 can include imperative bytecode 122 and services bytecode 124. As noted, the services bytecode represents service modules output by the code conversion process 112 discussed above with respect to FIG. 1, whereas the imperative bytecode represents the order of operations initially defined in the input source code 102. Generally, the runtime environment can coordinate running these two types of bytecode to obtain the same logical functionality as the input source code. The runtime process can also consider the dependency graph 106 generated during the code conversion process to ensure that the service tasks execute in a manner that is consistent with the data dependencies in the dependency graph.

The runtime environment 1002 can also consider execution logs 1006, which may convey information such as how long previous instances of individual service tasks have executed. In addition, the execution logs may convey information such as data distributions of individual runtime values, etc. Given this information, the runtime environment can identify information such as the critical path, e.g., the path through the dependency graph that takes the longest to execute. The runtime environment can run individual service tasks on the critical path early and/or prioritize these service tasks by giving them a higher scheduler priority to be executed as threads become available. In addition, where the data dependencies allow for parallelization, the runtime environment can parallelize the execution by running service modules in parallel in different service tasks.

Given the above inputs, the runtime environment 1002 can produce scheduling and/or orchestration outputs 1004. Generally, scheduling outputs convey when a specific service task executes, and orchestration outputs convey where the specific service task executes, e.g., on a specific virtual or physical machine. Various scheduling and orchestration considerations are described further below.

At a high level, the runtime processing flow 1000 can be viewed as a mechanism for executing code when data is available, rather than in a predefined order set forth in the source code. Because at least part of the source code has been converted into individual service modules as describe above, the service modules can be scheduled to run in respective service tasks according to the corresponding workflow modules. The runtime environment 1002 can coordinate runtime communication of data among the respective service tasks according to the workflow modules, e.g., by initiating a given service task once the input data for that service task becomes available.

Example Dependency Graphs

As noted above, the code conversion processing flow 100 can generate a dependency graph 106 at compile time. As discussed more below, the runtime environment 1002 can schedule service tasks at runtime based on the dependency graph. In addition, in some cases, the runtime environment can update the dependency graph at runtime using values determined at runtime. For instance, the runtime environment can update the dependency graph using outputs of service tasks and/or results computed by executing imperative bytecode. In some cases, the dependencies can be represented as a directed acyclical graph. Generally, if a given section of code can be represented as a directed acyclical graph, this implies that the code can be considered functional code and converted to service modules for parallelization and/or run-in-anticipation.

FIG. 11 illustrates three dependency graphs 1110, 1120, and 1130. Dependency graph 1110 generally corresponds to the source code examples shown in FIGS. 2 and 3. Node 1110(1) represents a first service task that runs Plugin_0 of the ConvertedParallelLoop class and populates response0. Node 1110(2) represents a second service task that runs Plugin_0 of the ConvertedParallelLoop class and populates response1. Node 1110(3) represents a third service task that runs Plugin_0 of the ConvertedParallelLoop class and populates response3. Node 1110(4) represents the operations performed by Plugin_1 on these three variables. Edges in the graph represent dependencies between individual service tasks. In this case, the dependency analysis 104 performed on the input source code at compile time can generate a complete dependency graph from the input source code 204, and thus can recognize that these three service tasks can be run in parallel. Because the completed dependency graph can be generated at compile time, the runtime environment 1002 can also run these service tasks in advance and/or prioritize them at any time once the input data is available, e.g., from other code modules in the application.

However, in some instances, the compile-time dependency analysis may not be able to fully complete the dependency checking process. For instance, consider an example with a loop that has a minimum of three iterations but an unbounded maximum number of iterations. In some implementations, separate service tasks for the first three iterations can be created at compile time as discussed above. In addition, a partial dependency graph such as dependency graph 1120 at compile time. Here, dependency graph 1120 has nodes similar to those of dependency graph 1110, with an additional node 1120(1). Node 1120(1) represents any additional loop iterations that may occur at runtime, and is shown in dotted lines to represent that the number of iterations is unresolved at compile time.

The runtime environment 1002 can receive dependency graph 1120 from the compiler. At some point, the number of loop iterations may become final, and the runtime environment can identify the point in the code where this occurs, e.g., a statement that sets a loop counter that is not subsequently modified at execution time. For this example, assume the total number of loop iterations determined at runtime is five. At this point, the runtime environment can modify dependency graph 1120 to obtain a completed dependency graph 1130. Completed dependency graph 1130 has two new nodes, 1130(1) and 1130(2), which have replaced node 1120(1). Nodes 1130(1) and 1130(2) represent additional service tasks which implement the two additional iterations of the loop. The runtime environment can cause these two service tasks to run Plugin_0 as previously discussed.

More generally, the runtime environment 1002 can receive data dependencies generated at compile time, e.g., in the form of a dependency graph. The dependency graph can identify ordering constraints for executing individual service tasks, and the runtime environment can run the service tasks in any order consistent with the ordering constraints. In some cases, the runtime environment can run any imperative bytecode that has not been converted to services to obtain result data, and that result data can be provided to individual service modules as input data when it becomes available. At that point, the imperative bytecode no longer defines the order of operations that are performed, and instead the runtime environment can arrange individual service tasks in any fashion provided that the ordering constraints identified at compile time and/or completed at runtime are respected.

As noted, when a partial dependency graph is generated at compile time, the runtime environment 1002 can complete the partial dependency graph at runtime based on a particular runtime value provided by a given service module. Once the dependency graph is completed, the runtime can insert additional service tasks into the application process, e.g., as represented by nodes 1130(1) and 1130(2) in dependency graph 1130. Note that a completed dependency graph can, in some cases, be represented as a directed acyclic graph with directional edges representing the direction of any data dependences in the graph.

Immutability Code Example

As noted above, a given application can include source code that performs operations on data items in a specified order. In some cases, the outcome of those operations will depend on mutable data, in which case the operations can be performed in the specified order according to the source code to ensure correct results. However, in other cases, the outcome of those operations may depend on immutable data, i.e., data that has fixed values as of compile time or at a certain point during runtime. Once a given data item becomes immutable, operations on that data item can be converted into functional code using the techniques described above. The following introduces a source code example that illustrates the distinction between mutable and immutable data.

FIG. 12 illustrates a source code snippet 1200 with a variable called p1, which is an instance of the ParallelLoop class discussed above with respect to FIG. 2. The Execute( ) routine of the ParallelLoop class is called twice in code snippet 1200, once in a function called Main1( ) and again in a function called Main2( ). The call to Execute( ) in Main1( ) uses a local string variable called in1 that is initialized to "abc" and then passed as an input to Execute( ) In this example, in1 is immutable because in1 is not modified after the call to Execute( ). This is the case because the scope of in1 is local to Main1( ) and thus in1 is not modified outside of the illustrated snippet. On the other hand, the call to Execute( ) in Main2( ) uses a local string variable in2 that is modified after the call to Execute( ) As a consequence, in2 is not immutable. During the code conversion process, the first call to Execute( ) in Main1( )

can be converted into parallelized services, as discussed above with respect to FIG. 3, whereas the second call to Execute( ) in Main(2) can remain as shown in FIG. 2.

In some cases, immutability analysis can be relatively complex, depending on the structure of the source code being analyzed. For instance, some variables may have values that depend on function calls in the code, and those functions may invoke other functions. In some implementations, the immutability analysis can involve recursively evaluating function calls in the code until a given data item is confirmed as immutable, and/or a stopping condition is reached. For instance, some implementations may designate a stopping condition as a threshold number of layers of recursive evaluation. Once the threshold number is reached, the immutability analysis may stop and designate the data item in question as mutable. While this may preclude some performance benefits as discussed herein, it ensures proper code execution.

A related issue involves function calls that pass parameters by value vs. pass parameters by reference. A variable that is passed by reference to a function can be modified in the body of the function. On the other hand, when a variable is passed by value to a function, the function being called receives a copy of that variable as an input parameter, and cannot modify the variable itself. As a consequence, pass-by-value function inputs are immutable and functions having only pass-by-value parameters can be run in parallel even in instances where the variables passed as input parameters are mutable.

Scheduling and Orchestration Considerations

As previously noted, the input source code examples discussed herein would conventionally be compiled into bytecode that executes the operations in the source code in a specific order defined by the source code. As a consequence, each function defined in the source code executes when it is explicitly called by some other code module. By converting some or all of the input code into service tasks, various opportunities for performance enhancements are provided, as discussed more below.

Referring back to FIG. 3, each of the service tasks defined in the workflow module of the ConvertedParallelLoop class can run at any time provided input data is available. In some cases, the runtime environment creates a single application process that runs imperative bytecode together with the respective service tasks of the ConvertedParallelLoop class.

As noted, an application process can include multiple threads that each share a common address space. Each service task can run in a separate thread. Because the address space is shared, data shared by different service tasks does not need to be serialized or communicated over a network. Moreover, because each service task can run in a separate thread, the service tasks can be scheduled independently of one another, to the extent that any data dependencies between the service tasks are accommodated. Thus, the order of operations defined in the input source code imposes fewer limitations on the order in which the operations are performed at runtime. Instead of executing the entire application as imperative bytecode with numerous individual functions that must wait to be invoked by other code modules, the runtime environment can simply run individual service tasks whenever the input data for that task becomes available.

In addition, the disclosed implementations allow for improved orchestration of code. Conventionally, a given application might be scheduled to run in a single application process with or without multiple threads. Once an entire application process is running on a given machine, it can be expensive to move that application process to another machine. In the disclosed implementations, individual service tasks can be moved to different application processes or to different physical or virtual machines in a flexible manner. While this can entail some serialization and network overhead, this flexibility can nevertheless allow for improved performance in some circumstances.

For instance, consider a heterogeneous processing environment where first virtual machines have access to high-performance hardware such as field-programmable gate arrays, and second virtual machines have only conventional central processing units. Further, consider an application that has relatively lightweight service tasks with the exception of a particular service task that runs very complex numerical operations, e.g., an encryption task. Conventionally, the entire application might need to run in a single virtual machine. By converting the application into data-independent service modules, the encryption service task can be moved over to the virtual machine with the high-performance hardware while the remaining service tasks can execute on the virtual machine that lacks these resources.

Example System

Figure 13:
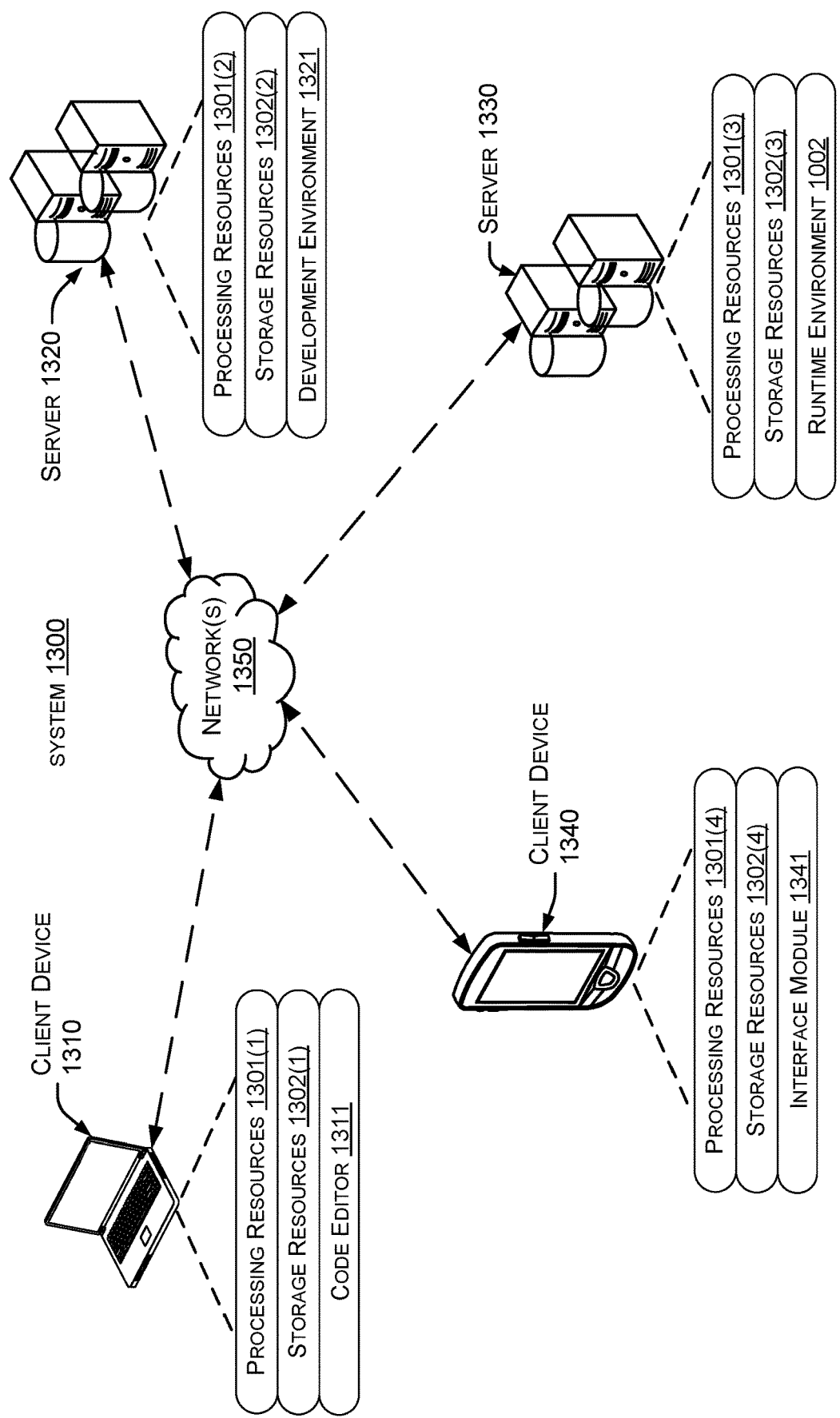
FIG. 13 illustrates an example system, consistent with some implementations of the present concepts.

The present implementations can be performed in various scenarios on various devices. FIG. 13 shows an example system 1300 in which the present implementations can be employed, as discussed more below. As shown in FIG. 13, system 1300 includes a client device 1310, a server 1320, a server 1330, and a client device 1340, connected by one or more network(s) 1350. Note that the client devices can be embodied both as mobile devices such as smart phones or tablets, as well as stationary devices such as desktops. Likewise, the servers can be implemented using various types of computing devices. In some cases, any of the devices shown in FIG. 13, but particularly the servers, can be implemented in data centers, server farms, etc.

Certain components of the devices shown in FIG. 13 may be referred to herein by parenthetical reference numbers. For the purposes of the following description, the parenthetical (1) indicates an occurrence of a given component on client device 1310, (2) indicates an occurrence of a given component on server 1320, (3) indicates an occurrence on server 1330, and (4) indicates an occurrence on client device 1340. Unless identifying a specific instance of a given component, this document will refer generally to the components without the parenthetical.

Generally, the devices 1310, 1320, 1330, and/or 1340 may have respective processing resources 1301 and storage resources 1302, which are discussed in more detail below. The devices may also have various modules that function using the processing and storage resources to perform the techniques discussed herein. For example, client device 1310 can include a code editor 1311 that can be used to edit code, such as the C #code shown in the preceding examples. The code entered via the code editor can be provided to server 1320, which can execute development environment 1321. Generally, the development environment can implement the code conversion processing flow 100 shown in FIG. 1.

Thereafter, the development environment 1321 can send the dependency graph 106, imperative bytecode 122, and/or services bytecode 124 to server 1330. On server 1330, runtime environment 1002 can implement the runtime processing flow 1000 shown in FIG. 10. Client device 1340 can interact with the runtime via interface module 1341, e.g., a local browser application, smartphone app, etc.

Example Source Code Conversion Method

Figure 14:
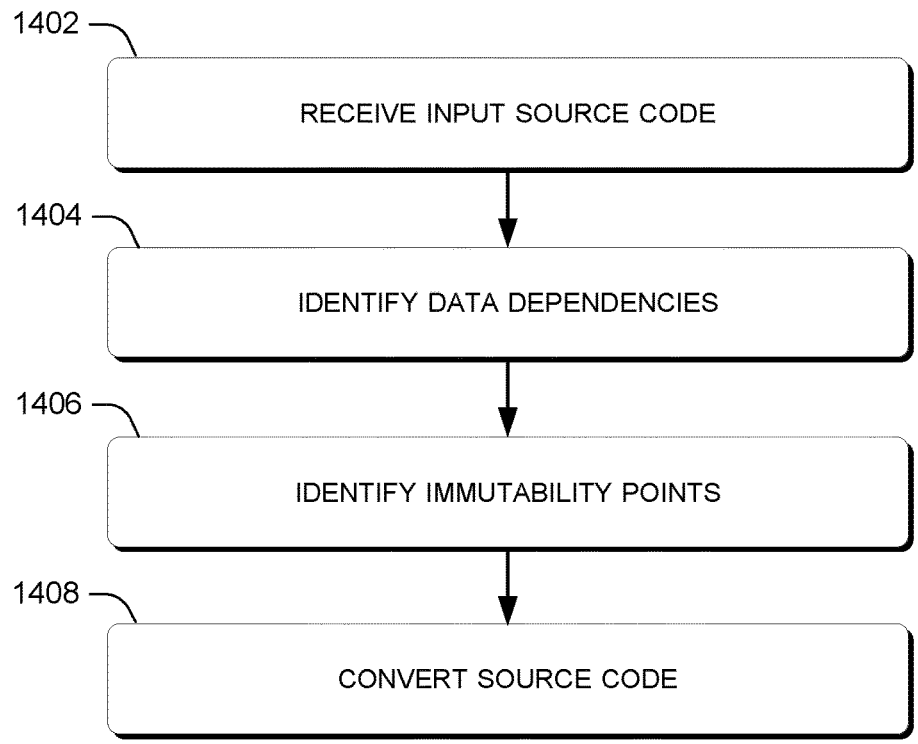
FIGS. 14 and 15 illustrate example methods or techniques, consistent with some implementations of the present concepts.

FIG. 14 illustrates an example method 1400 that can be used to convert source code, consistent with the present concepts. As discussed more below, method 1400 can be implemented on many different types of devices, e.g., by one or more cloud servers, by a client device such as a laptop, tablet, or smartphone, or by combinations of one or more servers, client devices, etc. In some implementations, method 1400 is performed by development environment 1321.

Method 1400 begins at block 1402, where input source code is received. FIGS. 2, 4, 6, 8, and 12 each illustrate examples of input source code.

Method 1400 continues at block 1404, where data dependencies are identified. FIG. 11 illustrates several dependency graphs that can be used to represent the data dependencies.

Method 1400 continues at block 1406, where immutability points are identified. Immutability detection is discussed above with respect to FIG. 12.

Method 1400 continues at block 1408, where source code is converted. Examples of converted source code are discussed above with respect to FIGS. 3, 5, 7, and 9.

Example Runtime Method

Figure 15:
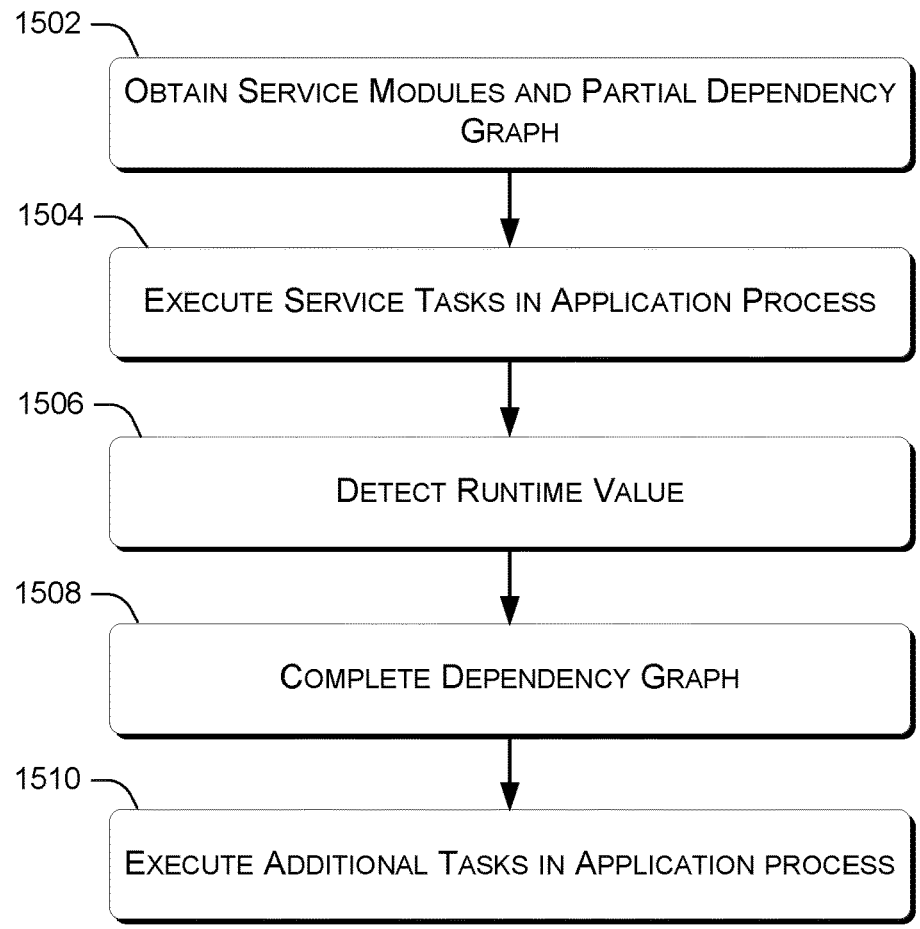

FIG. 15 illustrates an example method 1500 that can be performed at runtime, consistent with the present concepts. As discussed more below, method 1500 can be implemented on many different types of devices, e.g., by one or more cloud servers, by a client device such as a laptop, tablet, or smartphone, or by combinations of one or more servers, client devices, etc. In some implementations, method 1500 is performed by runtime environment 1002.

Method 1500 begins at block 1502, where service modules and a partial dependency graph are obtained. Examples of service modules are discussed above with respect to FIGS. 3, 5, 7, and 9.

Method 1500 continues at block 1504, where the service tasks are executed in an application process. Service tasks can be scheduled to run in an application process as discussed above with respect to FIG. 10.

Method 1500 continues at block 1506, where a particular runtime value is detected. For example, as discussed above with respect to FIG. 11, a runtime value such as a loop counter may be set to a final value by a service task or by imperative bytecode executing in runtime environment 1002.

Method 1500 continues at block 1508, where the partial dependency graph is completed. For example, additional service tasks can be inserted into the partial dependency graph based on the particular runtime value. In the example discussed above with respect to FIG. 11, two additional service tasks are inserted into a partial dependency graph when a loop counter is finalized at runtime.

Method 1500 continues at block 1508, where additional service tasks are executed in the application process. For instance, the additional service tasks can perform operations that were originally performed in the input source code by the two additional loop iterations that were detected at runtime.

Further Considerations

The discussion set forth above used object-oriented source code examples to convey certain concepts. However, the disclosed techniques can be performed on other types of source code, including procedural programming languages as noted above. In addition, while the examples set forth above discuss bytecode generation as an example of source code conversion, some implementations can convert input source code directly into a binary format that implements services as described above.

In addition, note that the source code examples set forth above provide specific examples of how certain operations can be converted into service modules. However, one skilled in the art will recognize that many other source code operations can be converted into service modules consistently with the present concepts. For instance, in some cases, the input source code may have a conditional statement such as an if or switch statement. Broadly speaking, one approach for converting such source code to service modules can involve replicating the conditional statement in multiple service modules. By doing so, the original functionality of the input source code can be preserved.

In addition, note that some implementations may group individual service modules together to create corresponding services. For instance, consider a service module that does encryption and another service module that does decryption. These service modules can be logically combined into a single service that is deployable together, and that can be replicated in different applications.

Because the individual service modules are defined without cross-module data dependencies, the service modules can be flexibly deployed at runtime. In some cases, services can be "hot-swapped" at runtime by replacing a deprecated service module with a newer version. Generally, "hot-swapping" a service module can involve inserting a new bytecode or binary version of the service module into the memory of the running process, without necessarily stopping the process.

In addition, because the service modules are defined without cross-module data dependencies, they can be reused across different applications without needing to be rewritten. Thus, application developers can write source code as if they were developing a conventional library with data dependencies between different library modules, while the code conversion process outputs data-independent service modules.

Device Implementations

As noted above with respect to FIG. 13, system 1300 includes several devices, including a client device 1310, a server 1320, a server 1330, and a client device 1340. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage resources. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. In some cases, the modules of system 1300 are provided as executable instructions that are stored on persistent storage devices, loaded into the random-access memory devices, and read from the random-access memory by the processing resources for execution.

As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1350. Without limitation, network(s) 1350 can include one or more local area networks (LANs), wide area networks (WANs), the Internet, and the like.

In addition, some implementations may employ any of the disclosed techniques in an Internet of Things (IoT) context. In such implementations, a home appliance or automobile might provide computational resources that implement the modules of system 1300.

Various device examples are described above. Additional examples are described below. One example includes a method performed by a computing device, the method comprising receiving input source code, identifying data dependencies in the input source code, based at least on the data dependencies, identifying immutability points in the input source code, and converting at least some of the input source code occurring after the immutability points to one or more service modules.

Another example can include any of the above and/or below examples where identifying the data dependencies comprises constructing a graph with nodes and edges representing the data dependencies.

Another example can include any of the above and/or below examples where the graph is a directed acyclic graph.

Another example can include any of the above and/or below examples where the method further comprises compiling portions of the input source code prior to the immutability points into imperative bytecode and compiling the one or more service modules into services bytecode.

Another example can include any of the above and/or below examples where the converting further comprises creating service tasks to execute instances of the one or more service modules.

creating service tasks to execute instances of the one or more service modules where the method further comprises based at least on the data dependencies, identifying at least two service tasks that can run in parallel and configuring the at least two service tasks to execute in parallel at runtime.

Another example can include any of the above and/or below examples where the identifying the data dependencies comprises identifying at least one data item that is updated in only one iteration of a loop in the input source code.

Another example can include any of the above and/or below examples where the method further comprises based at least on the data dependencies, detecting that a particular service task depends on output of another service task and configuring the particular service task to await output of the another service task at runtime.

Another example can include any of the above and/or below examples where the detecting the data dependencies comprises detecting at least one data item that is updated in multiple iterations of a loop in the input source code.

Another example includes a system comprising a hardware processing unit and a storage resource storing computer-readable instructions which, when executed by the hardware processing unit, cause the hardware processing unit to: receive input source code for an application, identify data dependencies in the input source code, based at least on the data dependencies, identify immutability points in the input source code, convert at least some of the input source code occurring after the immutability points to one or more service modules, and consistently with the data dependencies, schedule service tasks that execute the service modules at runtime.

Another example can include any of the above and/or below examples where the computer-readable instructions, when executed by the hardware processing unit, cause the hardware processing unit to access one or more execution logs reflecting prior executions of the service modules and schedule the service tasks based at least on the one or more execution logs.

Another example can include any of the above and/or below examples where the computer-readable instructions, when executed by the hardware processing unit, cause the hardware processing unit to: based at least on the data dependencies, identify ordering constraints for executing the service tasks and run the service tasks consistently with the identified ordering constraints.

Another example can include any of the above and/or below examples where the computer-readable instructions, when executed by the hardware processing unit, cause the hardware processing unit to, in at least one instance, run multiple service tasks in parallel as indicated by the ordering constraints Another example can include any of the above and/or below examples where the computer-readable instructions, when executed by the hardware processing unit, cause the hardware processing unit to, in at least one instance, run multiple service tasks in series as indicated by the ordering constraints.

Another example can include any of the above and/or below examples where the computer-readable instructions, when executed by the hardware processing unit, cause the hardware processing unit to: compile a first portion of the input source code into imperative bytecode, execute the imperative bytecode to obtain result data, and provide the result data as input data to individual service tasks when available.

Another example can include any of the above and/or below examples where the computer-readable instructions, when executed by the hardware processing unit, cause the hardware processing unit to output a workflow module that relates the service tasks and coordinate runtime communication among the service tasks according to the workflow module.

Another example includes a method performed by a computing device, the method comprising: obtaining one or more service modules and a partial dependency graph of service tasks for executing the one or more service modules, executing the service tasks in an application process, detecting a particular runtime value that is output by a particular service task, based at least on the particular runtime value, inserting one or more additional service tasks into the partial dependency graph to obtain a completed dependency graph, and based at least on the completed dependency graph, executing the one or more additional service tasks in the application process.

Another example can include any of the above and/or below examples where the method further comprises obtaining a workflow module that defines the service tasks and executing the service tasks in the application process according to the workflow module.

Another example can include any of the above and/or below examples where the method further comprises based at least on the completed dependency graph, identify at least two additional service tasks that can be run in parallel and scheduling the at least two additional service tasks to run in parallel in the application process.

Another example can include any of the above and/or below examples where the particular runtime value comprises a loop counter.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed by a computing device, the method comprising:
   receiving input source code specifying a particular order to perform multiple operations involving calling a particular function with data items as input parameters;
   identifying data dependencies in the input source code;
   based at least on the data dependencies, identifying immutability points in the input source code;
   converting at least some of the input source code occurring after the immutability points to one or more service modules; and
   generating a workflow module, wherein, when compiled with the one or more service modules and executed at runtime with the one or more service modules, the workflow module is configured to designate respective service tasks that execute the one or more service modules and coordinate runtime processing by the respective service tasks,
   the workflow module allowing the respective service tasks to perform the multiple operations by calling the particular function with the data items as input parameters in a different order than the particular order specified by the input source code.

2. The method of claim 1, wherein the respective service tasks run in a single application process with the workflow module.

3. The method of claim 2, wherein the respective service tasks communicate via shared memory.

4. The method of claim 3, wherein the respective service tasks communicate data among one another without serialization.

5. The method of claim 1, wherein the respective service tasks are asynchronous tasks that are created by the workflow module at runtime.

6. The method of claim 5, wherein each service task corresponds to a different iteration of a loop in the input source code.

7. The method of claim 5, wherein the workflow module configures each service task to await input data.

8. A system comprising:
   a hardware processing unit; and
   a storage resource storing computer-readable instructions which, when executed by the hardware processing unit, cause the hardware processing unit to:
   receive input source code specifying a particular order to perform multiple operations involving calling a particular function with data items as input parameters;
   identify data dependencies in the input source code;
   based at least on the data dependencies, identify immutability points in the input source code;
   convert at least some of the input source code occurring after the immutability points to one or more service modules; and
   generate a workflow module, wherein, when compiled with the one or more service modules and executed at runtime with the one or more service modules, the workflow module is configured to designate respective service tasks that execute the one or more service modules and coordinate runtime processing by the respective service tasks,
   the workflow module allowing the respective service tasks to perform the multiple operations by calling the particular function with the data items as input parameters in a different order than the particular order specified by the input source code.

9. The system of claim 8, wherein the respective service tasks run in a single application process.

10. The system of claim 9, wherein the respective service tasks communicate via shared memory.

11. The system of claim 10, wherein the respective service tasks communicate data among one another without serialization.

12. The system of claim 8, wherein the respective service tasks are asynchronous tasks.

13. The system of claim 12, wherein each service task corresponds to a different iteration of a loop in the input source code.

14. The system of claim 12, wherein the workflow module configures each service task to await input data.

15. A computer-readable storage medium storing executable instructions which, when executed by a hardware processing unit, cause the hardware processing unit to perform acts comprising:
   receiving input source code specifying a particular order to perform multiple operations
      involving calling a particular function with data items as input parameters;
   identifying data dependencies in the input source code;
   based at least on the data dependencies, identifying immutability points in the input source code;
   converting at least some of the input source code occurring after the immutability points to one or more service modules; and
   generating a workflow module, wherein, when compiled with the one or more service modules and executed at runtime with the one or more service modules, the workflow module designates respective service tasks that execute the one or more service modules and coordinates runtime processing by the respective service tasks,
      the workflow module allowing the respective service tasks to perform the multiple operations by calling the particular function with the data items as input parameters in a different order than the particular order specified by the input source code.

16. The computer-readable storage medium of claim 15, wherein the respective service tasks run in a single application process.

17. The computer-readable storage medium of claim 16, wherein the respective service tasks communicate via shared memory.

18. The computer-readable storage medium of claim 17, wherein the respective service tasks communicate data among one another without serialization.

19. The computer-readable storage medium of claim 15, wherein the respective service tasks are asynchronous tasks.

20. The computer-readable storage medium of claim 19, wherein each service task corresponds to a different iteration of a loop in the input source code.

21. The computer-readable storage medium of claim 20, wherein:
   the input source code specifies that:
      the particular function is called with a first data item as an input parameter in a first iteration of the loop,
      the particular function is called with a second data item as an input parameter in a second iteration of the loop, and
      the second iteration of the loop occurs after the first iteration, and
   the workflow module allows a service task that calls the particular function with the second data item as an input parameter to execute before another service task that calls the particular function with the first data item as an input parameter.

* * * * *